United States Patent Office 3,236,632
Patented Feb. 22, 1966

3,236,632
HIGH STRENGTH ALUMINUM ALLOY FOR PELLET EXTRUSION AND PRODUCT
George S. Foerster, Midland, Mich., assignor to The Dow Chemical Company, Midland, Mich., a corporation of Delaware
No Drawing. Filed Dec. 1, 1964, Ser. No. 415,148
4 Claims. (Cl. 75—138)

This application is a continuation-in-part of application Serial No. 182,650, filed March 26, 1962, now abandoned.

This invention relates to aluminum alloys and more particularly is concerned with a novel aluminum alloy having particular utility in the preparation of high strength pellet extrusions and to an extruded product prepared therefrom.

In general, this novel aluminum base alloy contains on a weight basis from about 0.5 to about 2 percent magnesium, from about 0.5 to about 10 percent silicon, and a member selected from the group consisting of nickel and vanadium. Ordinarily with nickel from about 3 to about 10 percent by weight and preferably from about 4 to about 6 percent of this additive member is added to the alloy. From about 1.5 to about 3 weight percent and preferably about 2 weight percent of vanadium is employed. The magnesium and silicon concentrations are adjusted so that there is at least sufficient silicon to form magnesium silicide ($Mg_2Si$) with the magnesium present in the alloy. The actual amount of the additive metal to be employed in the alloy is varied in accordance with the properties and characteristics, e.g. density, etc. desired in the extruded product. Generally, the higher concentrations of additive metal are employed when rapid quenching of the alloy product is carried out.

The alloy is prepared using foundary alloying and melt techniques as practiced in the aluminum art.

This alloy particularly is suitable for fabricating high strength pellet extrusions. In this operation, a melt of the alloy is prepared and rapidly quenched as by atomizing into pellets. Conveniently the pellets can be produced by jet atomizing or wheel atomizing either in an inert atmosphere such as natural gas, nitrogen, argon, etc. for example, or in air. The atomized pellets are fabricated into high strength extrusions using normal pellet extrusion techniques and apparatus.

For use in the pellet extrusion process, ordinarily the pellets are preheated to a temperature at least that of the extruder container and the heated pellets then are loaded into the container and extruded. However, if desired, the pellets can be used in the extrusion process without preheating. Also the pellets can be precompacted prior to extrusion. By precompacting the pellets under reduced pressure, blistering and formation of internal voids substantially are avoided during any post extrusion heat treatment that may be employed.

The so-extruded product can be solution heat treated, quenched and aged if desired. In this treatment, preferably the length of time for solution heat treatment is minimized to avoid (1) agglomeration of any dispersed phase that might be present in the alloy, (2) recovery, (3) recrystallization and (4) loss of strength.

For those alloys which contain silicon in excess of the solid solubility of this element in the alloy, high strength extrusions and particularly pellet extrusions unexpectedly can be produced at relatively low extrusion temperatures, i.e. from about 750 to about 850° F. Further increase in the strength of the extrusion results by directly quenching the extruded product as it emerges from the die and aging.

The following example will serve to illustrate further the utility of the present invention but is not meant to limit it thereto.

*Example.*—An aluminum base-magnesium-silicon alloy containing either nickel or vanadium as an additive member was prepared. The alloy was atomized into pellet form, about 85% of the resulting pellets ranging from −20+200 mesh U.S. Standard Sieve, balance passing through the 200 mesh sieve.

A batch of the atomized alloy pellets was preheated to about 700° F. and placed in the pellet container of a ram extruder which container also was about this same temperature.

The pellets were extruded at an extrusion temperature of about 800° F. and an extrusion rate of about 5 feet per minute into a strip 0.2 inch thick by 1 inch wide. The resulting strip then was solution heat treated at about 970° F. for ½ hour, quenched and aged 16 hours at 320° F. As a control, alloys containing approximately the same quantities of magnesium and silicon, with or without other additive metals were similarly atomized, extruded and heat treated.

Standard test bars were prepared and the percent elongation, tensile yield strength and tensile strength of the alloys determined at room temperature. The results of these tests are presented in Table I which follows:

Table I

| Run No. | Alloying Constituent | | | Test Results | | | Remarks |
|---|---|---|---|---|---|---|---|
| | Mg | Si | Other | E | TYS | TS | |
| 1 | 0.9 | 0.9 | | 12 | 36 | 49 | Control. |
| 2 | 1.2 | 0.7 | | 10 | 37 | 41 | Do. |
| 3 | 1.8 | 1.1 | 3 Ca | 14 | 18 | | Do. |
| 4 | 1.4 | 1.1 | 7.7 Ce* | 16 | 22 | | Do. |
| 5 | 1 | 1 | 2 Cr | 13 | 28 | | Do. |
| 6 | 1.2 | 0.8 | 6 Fe | 12 | 26 | 41 | Do. |
| 7 | 1 | 1.1 | 4 Mn | 14 | 27 | | Do. |
| 8 | 0.9 | 1.1 | 4.6 Ni | 7 | 46 | 52 | |
| 9 | 0.9 | 1.1 | 4.6 Ni | 6 | 50 | | |
| 10 | 1.4 | 0.6 | 4.9 Ni | 9 | 52 | | |
| 11 | 1.2 | 0.8 | 2 V | 9 | 48 | 53 | |
| 12 | 1.2 | 2.5 | 2 V | 8 | 53 | 60 | |

*Added as misch metal.

The results of these tests clearly show the unexpected strength obtained in pellet extrusions prepared from the alloy composition disclosed herein.

In a manner similar to that set forth for the foregoing example high strength pellet extrusions can be prepared from alloys having the following compositions:

Al—0.5Mg—0.5Si—3Ni
Al—1.5Mg—10Si—1.5V
Al—1Mg—0.7Si—6Ni
Al—0.5Mg—1Si—3V
Al—1.5Mg—2Si—10Ni

Various modifications can be made in the present invention without departing from the spirit or scope thereof for it is understood that I limit myself only as defined in the appended claims.

I claim:

1. An aluminum alloy consisting essentially of from about 0.5 to about 2 weight percent magnesium, from about 0.5 to about 10 weight percent silicon, nickel balance aluminum, the concentration in weight percent of said nickel to be utilized in said alloy being from about 3 to about 10 and the magnesium and silicon concentrations being adjusted so that there is at least sufficient silicon to form magnesium silicide ($Mg_2Si$) with the magnesium present in the alloy.

2. A high strength aluminum alloy pellet extrusion formed from a pelletized aluminum alloy consisting essentially of from 0.5 to about 2 weight percent magnesium, from about 0.5 to about 10 weight percent silicon, an additive metal, and remainder aluminum, the magnesium and silicon concentrations being adjusted so that there is at least sufficient silicon to form magnesium silicide ($Mg_2Si$) with the magnesium present in the alloy, said additive metal being a member selected from the group consisting of from about 3 to about 10 weight percent nickel and from about 1.5 to about 3 weight percent vanadium, said extrusion being characterized after extruding at from about 750 to about 850° F., solution heat treating at about 970° F., quenching and aging by an unexpectedly high tensile strength.

3. A high strength aluminum alloy pellet extrusion formed from a pelletized aluminum alloy consisting essentially of from about 1 to about 1.5 weight percent magnesium, from about 0.5 to about 1 weight percent silicon, from about 4 to about 6 weight percent nickel, balance aluminum, the magnesium and silicon concentrations being adjusted so that there is at least sufficient silicon to form magnesium silicide ($Mg_2Si$) with the magnesium present in the alloy, said extrusion being characterized after extruding at from about 750 to about 850° F., solution heat treating at about 970° F., quenching and aging by a minimum tensile yield strength of about 46K s.i.

4. A high strength aluminum alloy pellet extrusion formed from a pelletized aluminum alloy consisting essentially of about 1.2 weight percent magnesium, from about 0.8 to about 2.5 weight percent silicon, about 2 weight percent vanadium, balance aluminum, said extrusion being characterized after extruding at from about 750 to about 850° F., solution heat treating at about 970° F., quenching and aging by a minimum tensile yield strength of about 48K s.i.

References Cited by the Examiner
UNITED STATES PATENTS

| | | | |
|---|---|---|---|
| 1,910,861 | 5/1933 | Keller et al. | 75—147 |
| 2,280,177 | 4/1942 | Stroup | 75—147 |
| 2,966,731 | 1/1961 | Towner et al. | 75—138 X |
| 3,031,299 | 4/1962 | Criner | 75—148 X |
| 3,113,052 | 12/1963 | Schneck | 148—159 X |

FOREIGN PATENTS

| | | |
|---|---|---|
| 603,162 | 6/1948 | Great Britain. |

DAVID L. RECK, *Primary Examiner.*